(12) United States Patent
Richter et al.

(10) Patent No.: US 8,689,656 B2
(45) Date of Patent: Apr. 8, 2014

(54) SHIFTING DEVICE FOR A GEARBOX

(75) Inventors: Frank Richter, Oberteuringen (DE);
Reiner Keller, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 166 days.

(21) Appl. No.: 13/515,533

(22) PCT Filed: Nov. 3, 2010

(86) PCT No.: PCT/EP2010/066702
§ 371 (c)(1),
(2), (4) Date: Jun. 13, 2012

(87) PCT Pub. No.: WO2011/072945
PCT Pub. Date: Jun. 23, 2011

(65) Prior Publication Data
US 2012/0255382 A1    Oct. 11, 2012

(30) Foreign Application Priority Data

Dec. 18, 2009   (DE) .......................... 10 2009 054 942

(51) Int. Cl.
*F16H 3/38*    (2006.01)
(52) U.S. Cl.
USPC ........................ 74/339; 192/53.33; 192/53.34
(58) Field of Classification Search
USPC ................ 74/339; 192/53.33, 53.34
See application file for complete search history.

(56) References Cited

U.S. PATENT DOCUMENTS

| | | | |
|---|---|---|---|
| 5,735,176 A | 4/1998 | Winkam et al. | |
| 6,003,649 A * | 12/1999 | Fischer et al. | 192/3.58 |
| 6,634,247 B2 * | 10/2003 | Pels et al. | 74/329 |
| 6,729,458 B2 * | 5/2004 | Blechschmidt et al. | 192/53.34 |
| 6,886,673 B2 * | 5/2005 | Burger | 192/53.4 |
| 2011/0296948 A1 * | 12/2011 | Yoshimi et al. | 74/665 R |

FOREIGN PATENT DOCUMENTS

| | | |
|---|---|---|
| DE | 199 20 064 A1 | 11/2000 |
| DE | 199 41 568 A1 | 3/2001 |
| DE | 600 01 023 T2 | 8/2003 |
| DE | 10 2007 010 871 A1 | 10/2007 |
| DE | 10 2008 027 775 A1 | 12/2009 |
| EP | 0 741 258 A1 | 11/1996 |
| GB | 2 436 969 A | 10/2007 |

* cited by examiner

*Primary Examiner* — Ha D Ho
(74) *Attorney, Agent, or Firm* — Davis & Bujold, PLLC; Michael J. Bujold

(57) ABSTRACT

A shifting device for a gearbox which has at least one sliding sleeve that is placed on a transmission shaft in a rotationally fixed and axially movable manner. One idler gear, which is rotationally supported on the transmission shaft, is located at on one side adjacent the sleeve. The sliding sleeve can be axially moved, by an actuating element, from a neutral position into a shifting position toward the idler gear, and upon reaching the shifting position, couples the idler gear with the transmission shaft. The associated actuating elements are arranged in a stationary manner and, upon actuation, engage with at least one shifting groove, provided on an outside diameter of the at least one sliding sleeve and has a curve-shaped path, in the axial direction, so that rotation of the transmission shaft axially shifts the sliding sleeve according to the further path of the shifting groove.

12 Claims, 4 Drawing Sheets

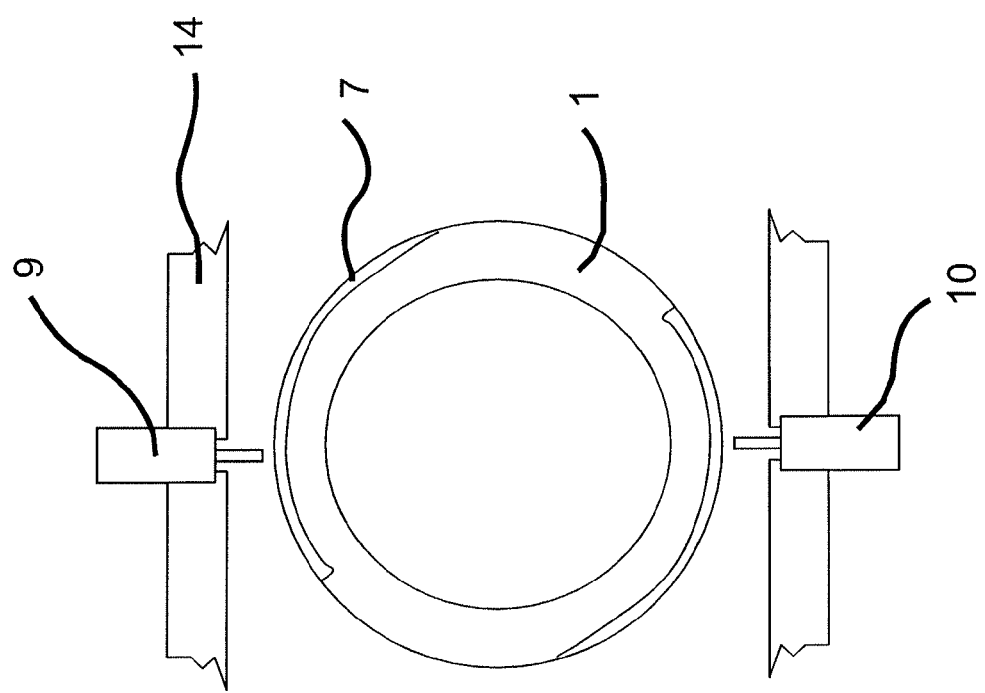

SHIFTING DEVICE FOR A GEARBOX

This application is a National Stage completion of PCT/EP2010/066702 filed Nov. 3, 2010, which claims priority from German patent application serial no. 10 2009 054 942.0 filed Dec. 18, 2009.

FIELD OF THE INVENTION

The invention relates to a shifting device for a gearbox, having at least one sliding sleeve, which is placed on a transmission shaft in a rotationally fixed and axially movable manner and adjacent to which is placed one idler gear each on at least one side, the idler gear being disposed on the transmission shaft in a freely rotatable manner; wherein the at least one sliding sleeve can be moved axially from a neutral position in the direction of each idler gear into the shifting position by actuation of associated actuating means, and upon reaching the shifting position, causes the coupling of each idler gear to the transmission shaft.

BACKGROUND OF THE INVENTION

Gearboxes typically have shifting devices by means of which one of several selectable gear ratios can be selected, and thereby a specific rotational-speed and torque gear ratio can be set. With motor vehicle transmissions, a shifting device typically combines an inner and an outer gearshift, wherein the inner gearshift, which is the subject matter of the present invention, comprises components lying within a transmission housing, such as a control shaft, shift rails and synchronization components for selecting the respective gear ratio. In the field of modern motor vehicles, the elements of the inner shifting device are increasingly directly electronically controlled and actuated, such that mechanical components of an outer shifting device can largely be omitted. In these cases, the shifting movements of the components of the inner shifting device are caused directly by electronic actuators disposed within the transmission housing.

From the document DE 600 01 023 T2 a shifting device of a gearbox is known, in which sliding sleeves can be moved axially by means of actuating means in the form of shifting forks assigned thereto, in order to purposefully select an associated gear ratio of the gearbox by the respective axial movement. It is widely known that the sliding sleeves are each disposed in a rotationally fixed and axially movable manner on a transmission shaft that additionally supports an idler gear at least on one side adjacent to the respective sliding sleeve. Here, these idler gears can rotate freely on the transmission shaft and are in permanent engagement with pinions of a further transmission shaft disposed as a countershaft or as a parallel input or output shaft. The selectable gear ratios of the gearbox are defined according to the tooth ratios of the respectively meshing gears. With axial movement of the respective sliding sleeve from a neutral position in the direction of the respective idler gear into a shifting position, upon reaching the shifting position, this idler gear is coupled by the sliding sleeve to the transmission shaft, and thus, the rotational speeds and torques are transmitted from one transmission shaft to the other transmission shaft at the respective defined gear ratio.

In the document DE 600 01 023 T2, the shifting forks of the individual sliding sleeves are guided in an axially movable manner on a common control shaft, which can be rotated as desired via a pinion disposed on an end side by means of an electric actuating element. Furthermore, a cylinder is placed on the control shaft in a fixed connection thereto that on an outer diameter has a groove running in a curve in an axial direction. Furthermore, a bushing placed on the cylinder has a pin stamped on the inner diameter thereof that engages in the groove of the cylinder, and upon rotation of the control shaft performs an axial movement on the cylinder, corresponding to the course of the groove of the cylinder. Furthermore, the bushing, on the outer diameter thereof, has shifting fingers which, depending on the angular position of the bushing, contact one of the shifting forks and correspondingly transmit the axial movement of the bushing to the respective fork. In order to set the respective angular position of the bushing, the bushing is engaged, via a gearing, with an intermediate shaft that in turn is in contact, via a gear, with the control shaft.

Upon rotation of the control shaft by means of the electric actuating element, the bushing is moved in the axial direction according to the rotation of the cylinder, and thereby guides one of the shifting forks along with the bushing, such that ultimately movement of the respective sliding sleeve is initiated, and thus the selection of an associated gear ratio is initiated. Corresponding to the gear ratio between the control shaft and the intermediate shaft, the intermediate shaft in addition rotates the bushing during rotation of the control shaft with respect thereto, so that the shifting fingers come into successive contact with the individual shifting forks according to the shifting sequence of the manual gearbox. Thus, upon actuation of the electric actuating element, a consecutive upshift, or downshift is possible.

SUMMARY OF THE INVENTION

Based on this state of the art, the problem of the present invention is that of providing a shifting device of a gearbox that is distinguished by the lowest possible number of components and offers the greatest possible freedom with respect to the selection of the individual gear ratios.

The invention comprises the technical teaching that the associated actuating means are disposed in a stationary manner and during actuation engage in at least one shifting groove provided on an outer diameter of the respective sliding sleeve, and have a curve-shaped course in the axial direction such that upon rotation of the transmission shaft an axial movement of the at least one sliding sleeve can result that corresponds to the course of the shifting groove. Due to the interaction of the at least one shifting groove with the associated actuating means of the respective sliding sleeve, the respective sliding sleeve can be individually actuated in that upon actuation the actuating means engage in the shifting groove. The design of the shifting device is also implemented with a small number of components. Furthermore, the actuating means can also be dimensioned smaller, because initiating the shifting movement of the sliding sleeve with the use thereof requires only the force necessary for engagement in the shifting groove. This is because the actual shifting force for creating the axial movement of the sliding sleeve is created by the rotating transmission shaft, and converted into the axial movement of the sliding sleeve in a screw-like manner. In the process, depending on the axial course of the at least one shifting groove, the sliding sleeve can approach the idler gear with a defined approach speed, and thereby the idler gears can be coupled to the transmission shaft with a relatively high shifting force.

In contrast to this, the inner shifting device of the prior art has a significantly more complex design, and requires a larger number of components in order to shift among gear ratios. Here, in particular, rotation of the bushing running on the cylinder must be matched precisely to the sequential actuation of the shifting forks of the individual sliding sleeves. In addition, it is not possible to skip individual gear ratios, because the sliding sleeves are moved in the respective axial directions successively in a fixed sequence. Finally, the electric actuating element must also be dimensioned correspondingly large for the rotation of the control shaft and the intermediate shaft, because both the rotation of the control shaft causing the respective shifting movement and also the rotation of the bushing, must be implemented by the force of the actuating element.

According to one embodiment of the invention, there are first and second shifting grooves on the at least one sliding sleeve that have opposing courses in the axial direction, wherein the first shifting grooves upon engagement of the actuating means move the at least one sliding sleeve into the shifting position, while the second shifting grooves upon engagement of the shifting means ensure a reverse movement of the at least one sliding sleeve into the neutral position. This measure causes the transfer of the sliding sleeve both into the shifting position and into the neutral position by respectively associated shifting grooves, such that the movement of the sliding sleeve can be controlled precisely by engaging the respective shifting grooves.

In a further development of the invention, the first and the second shifting groove, in the end region in the direction of rotation, respectively taper off to the level of the outer diameter of the sliding sleeve. This has the advantage that the actuating means after reaching the desired position of the sliding sleeve, need not be guided out of the shifting groove in a targeted manner, but rather due to the tapering off of the groove, are returned automatically to the starting position.

In a further advantageous embodiment of the invention, the actuating means are disposed on opposite radial sides of the at least one sliding sleeve. The opposing placement of the actuating means around the sliding sleeve prevents tipping or canting of the sliding sleeve while performing the axial movement.

According to a further embodiment of the invention, the actuating means are in the form of at least one extendable actuating bolt that can be electromechanically actuated. Advantageously, this allows the actuating means to be realized in a very space-saving manner in the region of the shifting sleeve, while also allowing easy and precise control. It is also conceivable to implement the at least one actuating bolt as a pneumatically actuated or hydraulically actuated component.

In a further development of the invention, the at least one sliding sleeve at an inner diameter is effectively connected to a locking means, which locks the at least one shifting sleeve respectively in the neutral position and the shifting position. Expediently, the locking means is in the form of at least one spring-loaded ball, which is placed in an associated recess of the transmission shaft and in the neutral position and the shifting position of the sliding sleeve interacts with locking grooves, lying opposite thereof in these positions, on the at least one shifting sleeve. The locking means sharply reduces the danger of an undesired return of the sliding sleeve out of the respective position into which it was intentionally guided via the actuating means. A ball locking means can be integrated simply and in a space-saving manner between the transmission shaft and the sliding sleeve. In addition, the respective force for retaining the sliding sleeve in the desired position can be defined according to the spring loading of the at least one ball.

In an advantageous embodiment of the invention, the at least one sliding sleeve actuates, through an axial movement into the shifting position, a clutch, which is connected to the respective idler gear. Advantageously, a spring element is placed between the at least one sliding sleeve and the clutch. Due to such a design, a movement of the at least one sliding sleeve can indirectly attain a coupling of the respective idler gear to the transmission shaft. Due to the interposed spring a sufficient pressing force for actuating the respective clutch can be provided at any time. The clutch is preferably designed to be either a synchronizer or a multi-disc clutch, which upon actuation couples the idler gear to the transmission shaft.

BRIEF DESCRIPTION OF THE DRAWINGS

Additional measures improving the invention are presented in the following in more detail together with the description of the preferred embodiment of the invention on the basis of the figures.

Shown are:

FIG. 3 a lateral view of the sliding sleeve and the actuating means of the shifting device shown in FIG. 1;

DETAILED DESCRIPTION OF THE PREFERRED EMBODIMENTS

Figure 1:
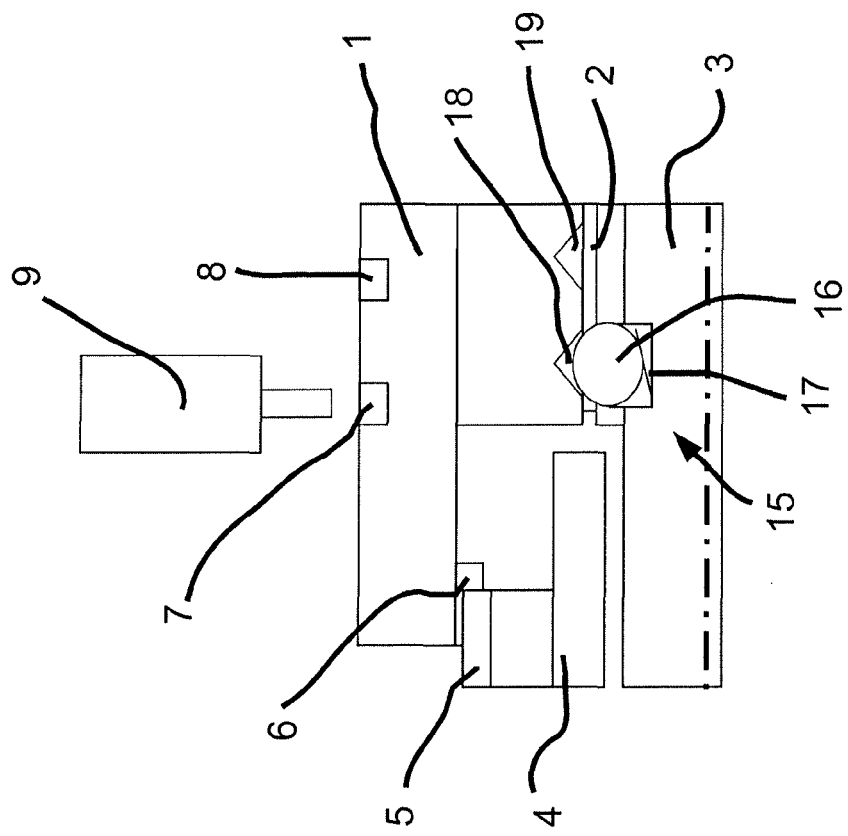
FIG. 1 a longitudinal section of the shifting device according to a first embodiment of the invention.

FIG. 1 shows a longitudinal section of the shifting device according to the invention in a first embodiment of the invention. The shifting device comprises a sliding sleeve 1, which is disposed on a transmission shaft 3 in a rotationally fixed and axially movable manner via synchronization gearing 2, and in the axial direction is placed adjacent to an idler gear 4. The idler gear 4, which is only partially depicted in this view, is disposed on the transmission shaft 3 in a freely rotatable manner, and is in permanent meshing engagement via a gearing—not shown—to a pinion—also not shown—of a defined transmission ratio of the shifting device. The idler gear 4, on one side facing toward the sliding sleeve 1, has a shifting gearing 5 that is designed to correspond to the gearing 6 on the sliding sleeve 1. Here, the shifting gearing 5 of the idler gear 4 and the gearing 6 of the sliding sleeve 1 in each case have tooth flanks facing each other, and are designed corresponding to a dog clutch, known to a person skilled in the art. It is also conceivable here to design a lock synchronization by an appropriate design of the sliding sleeve 1 and the idler gear 4, and by interposing one or more synchronization rings.

Figure 2:
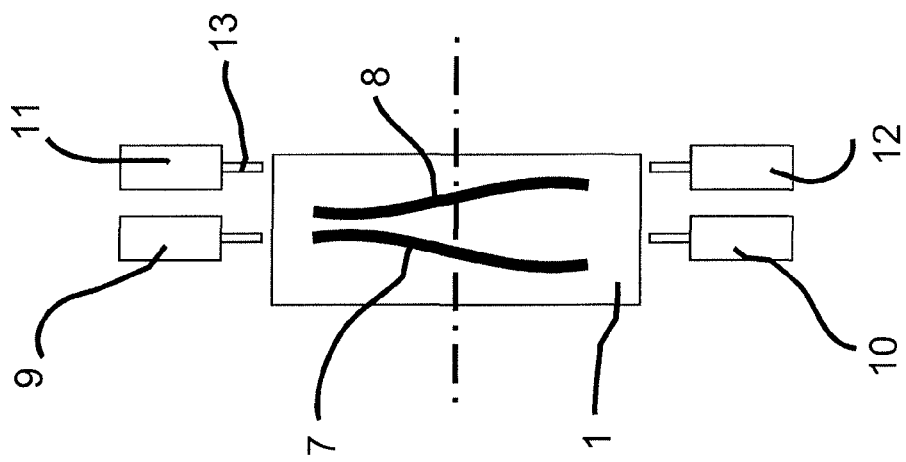
FIG. 2 a top view of a sliding sleeve and associated actuating means of the shifting device of FIG. 1.

Further, the sliding sleeve 1, on the outer diameter thereof, has shifting grooves 7 and 8 that, as can be seen in the top view of FIG. 2 in particular, have a curved course in the axial direction. In addition, the sliding sleeve 1 has actuating bolt pairs 9, 10 and 11, 12 on each of the opposing radial sides which upon actuation engage in each case with an extendable bolt 13 into the respectively associated shifting groove 7 or 8. As is seen in the lateral view of FIG. 3 in particular, the actuating bolts 9 to 12 are each placed fixed in location in a housing 14, such that movement of the respective actuating bolt pairs 9 and 10, or 11 and 12, into the associated shifting grooves 7 or 8, due to the axially changing course of these shifting grooves 7 or 8, causes corresponding axial movement of the sliding sleeve 1 on the transmission shaft 3. In the process, depending on the direction of rotation of the transmission shaft 3, and thus also of the sliding sleeve 1, an axial movement of the sliding sleeve 1 in the direction of the idler gear 4 is caused by the one actuating bolt pair 9 and 10 with the shifting groove 7, and a reverse movement of the sliding sleeve 1 directed away from the idler gear 4 is caused by the other actuating bolt pair 11 and 12 with the shifting groove 8. In addition, the actuating bolt pairs 9 and 10, or 11 and 12, are each placed at radially opposite sides of the sliding sleeve 1, as seen in FIG. 3 for the actuating bolt pair 9 and 10, whereby the sliding sleeve 1 is prevented from tipping during axial movement.

The actuating bolts 9 to 12 are designed as components that can be actuated electromagnetically, and which upon supply of power, ensure an extension of the respective bolt 13. It is obvious to the person skilled in the art that the actuating bolts 9 to 12 can also be designed just as well as components that are actuated hydraulically or pneumatically.

FIG. 1 shows the sliding sleeve 1 in the state of a shifting position thereof, in which the sliding sleeve is engaged via the gearing 6 with the shifting gearing 5 of the idler gear 4. In this shifting position, the idler gear 4 is therefore coupled in a rotationally fixed manner to the transmission shaft 3 via the sliding sleeve 1. Now, in order to move the sliding sleeve 1 out of the shifting position into a so-called neutral position, in which the shifting gearing 5 and the gearing 6 are no longer engaged, and in which the idler gear 4 therefore can again rotate freely with respect to the transmission shaft 3, only the actuating bolts 9 and 10 must be electrically controlled, whereupon the respective bolts 13 engage in the associated shifting groove 7. Due to the axial course of the shifting groove 7 and due to the common rotation of the sliding sleeve 1 with the transmission shaft 3, the sliding sleeve 1 is moved in the axial direction away from the idler gear 4 as a result. When the desired neutral position has been reached, the actuating bolts 9 and 10 are returned again into a starting position, in that the shifting grooves 7, and also the shifting grooves 8 taper off, in the end region in the direction of rotation, to a level of the outer diameter of the sliding sleeve 1, as seen also in FIG. 3. Thus, the bolts 13 of the actuating bolts 9 and 10 are automatically pushed out of the shifting grooves 7.

However, because the respective actuating bolt pairs 9 and 10, or 11 and 12, after the desired position of the sliding sleeve has been reached, are no longer in contact with the sliding sleeve 1, and thus in certain circumstances undesired axial movements of the sliding sleeve 1 could occur, a locking means 15 is provided between the sliding sleeve 1 and the transmission shaft 3. This locking means is comprised of a spring-loaded ball 16, which is placed in a recess 17 of the transmission shaft 3, and in each case, in the neutral position and the shifting position of the sliding sleeve 1, interacts with the locking grooves 18 and 19 opposite the sliding sleeve at an inner diameter of the sliding sleeve 1. According to the spring loading of the ball 16, the sliding sleeve 1 is locked by the ball in the respective position. If a change is now forced via the actuating bolts 9 to 12, from one position into the other position, the ball 16 is pushed back into the recess 17 until it is covered by the other locking groove 18 or 19 on the sliding sleeve 1.

Figure 4:
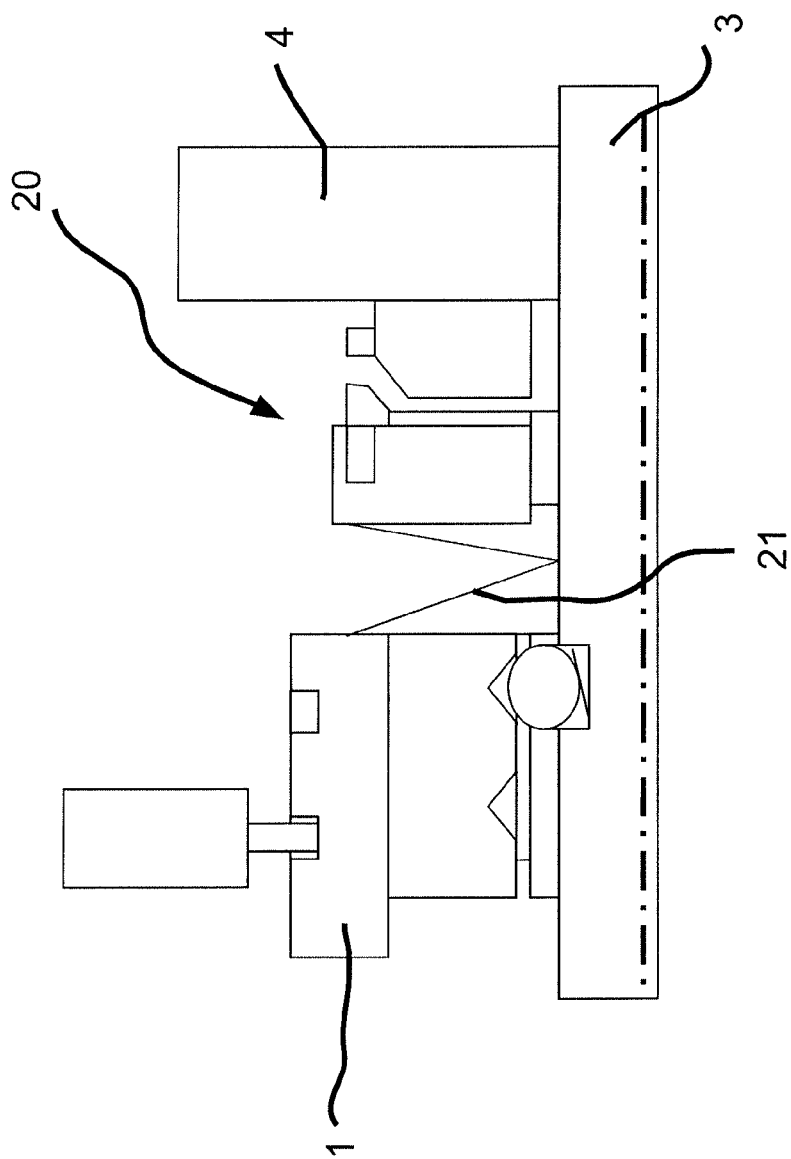
FIG. 4 a longitudinal section of the shifting device according to the invention, according to a further, second embodiment of the invention.

FIG. 4 shows the shifting device according to the invention according to a second embodiment of the invention. In contrast to the variant described above, in this case, the sliding sleeve 1 in the shifting position does not couple the idler gear 4 directly to the transmission shaft 3, but rather actuates a clutch, in the form of a synchronizer 20, which upon actuation then couples the idler gear 4 to the transmission shaft 3 in a manner known to the person skilled in the art. In order to be able to provide the pressing force necessary for this, a spring element 21 is placed between the sliding sleeve 1 and the synchronizer 20 that after preloading by the movement of the sliding sleeve 1 into the shifting position, continuously transfers a pressing force to the synchronizer 20. Thus in this case, the sliding sleeve 1 couples the idler gear 4 indirectly to the transmission shaft 3.

Figure 5:
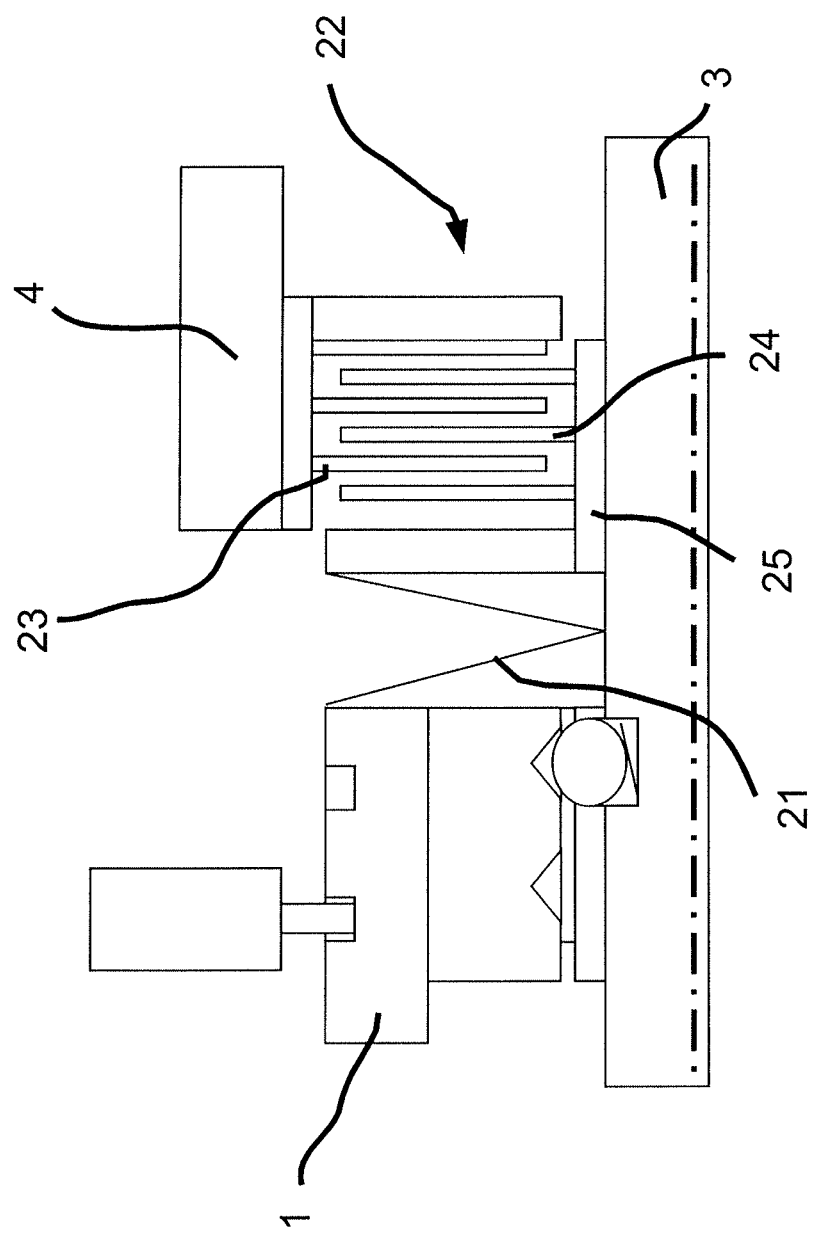
FIG. 5 a longitudinal section of the shifting device according to the invention, according to a third embodiment.

FIG. 5 shows a further, third embodiment of the invention. In contrast to the preceding variant, in this case, the clutch for coupling the idler gear 4 to the transmission shaft 3 is formed as a multi-disc clutch 22, the outer discs 23 of which are connected to the idler gear 4, and the inner discs 24 of which are connected to a slide 25 that can be moved axially on the transmission shaft 3. Here, this slide 25 is placed on the transmission shaft 3 in a rotationally fixed manner, and upon contact of the outer discs 23 with the inner discs 24, couples the idler gear 4 to the transmission shaft 3 in a force locking manner. Upon movement into the shifting position, the sliding sleeve 1 actuates the slide 25 via the interposed spring element 21 such that the multi-disc clutch 22 is engaged. Thus, in this case too, there is an indirect coupling of the idler gear 4 to the transmission shaft 3 via the sliding sleeve 1.

Thus it is possible by means of the shifting device according to the invention to perform shifting procedures in a very compact assembly thereof, and with a small number of components. In this case, the actuating means can be designed in the form of the actuating bolts 9 to 12, having a compact size, because the actual shifting force for coupling the idler gear 4 to the transmission shaft 3 is brought about by the rotational movement of the transmission shaft 3 and the screw-like effect of the shifting grooves 7 and 8. In the process, the shifting force is provided at a constant level by the movement of the sliding sleeve 1.

REFERENCE CHARACTERS 1 sliding sleeve
2 synchronization gearing
3 transmission shaft
4 idler gear
5 shifting gearing
6 gearing
7 shifting grooves
8 shifting grooves
9 actuating bolt
10 actuating bolt
11 actuating bolt
12 actuating bolt
13 bolt
14 housing
15 locking means
16 ball
17 recess
18 locking groove
19 locking groove
20 synchronizer
21 spring element
22 multi-disc clutch
23 outer discs
24 inner discs
25 slide

The invention claimed is:

1. A shifting device for a gearbox, having at least one sliding sleeve (1), which is placed on a transmission shaft (3) in a rotationally fixed and axially movable manner, and adjacent to which is placed one idler gear (4) each on at least one side, which is disposed in a freely rotatable manner on the transmission shaft (3), the at least one sliding sleeve (1) being axially movable, by actuation of associated actuating means, from a neutral position into a shifting position toward the one idler gear (4) and, upon reaching the shifting position, causing coupling of the one idler gear (4) to the transmission shaft (3), the associated actuating means being arranged in a stationary manner and, upon actuation, engaging in at least one shifting groove (7, 8) which is provided on an outer diameter of the at least one sliding sleeve (1) and has a curve-shaped path, in an axial direction, such that upon rotation of the transmission shaft (3), the at least one sliding sleeve (1) being axially shiftable according to the path of the at least one shifting groove (7; 8).

2. The shifting device according to claim 1, wherein first and second shifting grooves (7, 8) have opposing curve-shaped paths in the axial direction, the first shifting grooves (8), upon engagement of the actuating means, move the at least one sliding sleeve (1) into the shifting position, while the second shifting grooves (7), upon engagement of the actuating means, facilitates reverse movement of the at least one sliding sleeve (1) into the neutral position.

3. The shifting device according to claim 2, wherein the first and the second shifting grooves (7, 8) each in the direction of rotation at an end region taper off to a level of the outer diameter of the at least one sliding sleeve (1).

4. The shifting device according to claim 1, wherein the actuating means are disposed on radially opposing sides of the at least one sliding sleeve (1).

5. The shifting device according to claim 1, wherein the actuating means are at least one extendable actuating bolt (9 to 12) which is electromagnetically actuated.

6. The shifting device according to claim 1, wherein the at least one sliding sleeve (1) is in effective engagement, at an inner diameter thereof, with a locking means (15) which locks the at least one sliding sleeve (1) respectively in the neutral position and the shifting position.

7. The shifting device according to claim 6, wherein the locking means (15) is a spring-loaded ball (16) which is placed in an associated recess (17) of the transmission shaft (3) and, in the neutral position and the shifting position of the at least one sliding sleeve (1), interacts with the respectively opposite locking grooves (18, 19) of the at least one sliding sleeve (1).

8. The shifting device according to claim 1, wherein the at least one sliding sleeve (1) actuates, with an axial movement into the shifting position, a clutch which, in each case, is connected to an idler gear (4).

9. The shifting device according to claim 8, wherein a spring element (21) is placed between the at least one sliding sleeve (1) and the clutch.

10. The shifting device according to claim 8, wherein the clutch is a synchronizer (20).

11. The shifting device according to claim 8, wherein the clutch is a multi-disc clutch (22).

12. A gearbox of a motor vehicle in combination with a shifting device having at least one sliding sleeve (1) being placed on a transmission shaft (3) in a rotationally fixed and axially movable manner, and adjacent to which is placed one idler gear (4) each on at least one side, which is disposed in a freely rotatable manner on the transmission shaft (3), the at least one sliding sleeve (1) being axially movable, by actuation of associated actuating means, from a neutral position into a shifting position toward the one idler gear (4) and, upon reaching the shifting position, causing a coupling of the one idler gear (4) to the transmission shaft (3), the associated actuating means being arranged in a stationary manner and, upon actuation, engaging in at least one shifting groove (7, 8) provided on an outer diameter of the at least one sliding sleeve (1) and having a curve-shaped path in an axial direction, such that upon rotation of the transmission shaft (3), the at least one sliding sleeve (1) being axially shiftable according to the path of the at least one shifting groove (7; 8).

* * * * *